(12) United States Patent
Kagi et al.

(10) Patent No.: US 6,460,124 B1
(45) Date of Patent: Oct. 1, 2002

(54) METHOD OF USING DELAYS TO SPEED PROCESSING OF INFERRED CRITICAL PROGRAM PORTIONS

(75) Inventors: Alain Kagi, Portland, OR (US); James R. Goodman; Ravi Rajwar, both of Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 31 days.

(21) Appl. No.: 09/693,030

(22) Filed: Oct. 20, 2000

(51) Int. Cl.[7] .................. G06F 12/08; G06F 13/00
(52) U.S. Cl. .................. 711/163; 711/119; 711/151
(58) Field of Search .................. 711/100, 119, 711/125, 145, 147, 151, 154, 158, 163

(56) References Cited

U.S. PATENT DOCUMENTS

| | | | | |
|---|---|---|---|---|
| 4,318,182 A | * | 3/1982 | Bachman et al. | 709/105 |
| 4,320,451 A | * | 3/1982 | Bachman et al. | 709/106 |
| 5,136,691 A | * | 8/1992 | Baror | 711/139 |
| 5,185,878 A | * | 2/1993 | Baror et al. | 711/123 |
| 6,014,728 A | * | 1/2000 | Baror | 711/133 |

OTHER PUBLICATIONS

James R. Goodman, et al.; Efficient Synchronization Primitives For Large–Scale Cache–Coherent Multiprocessors; 1989 ACM 0–89791.

* cited by examiner

*Primary Examiner*—Tuan V. Thai
(74) *Attorney, Agent, or Firm*—Quarles & Brady LLP

(57) ABSTRACT

Critical sections of a program, providing exclusive access to shared data in a multi-processor architecture may be inferred from standard instructions and used to invoke a cache protocol that delays the response of requests of other cache and thus counter intuitively improving performance of the system. During this delay, read-only copies of data may be provided and the delay may recognize two priorities of requests, one of which is not delayed so as to improve the release of locks held by different processors.

20 Claims, 3 Drawing Sheets

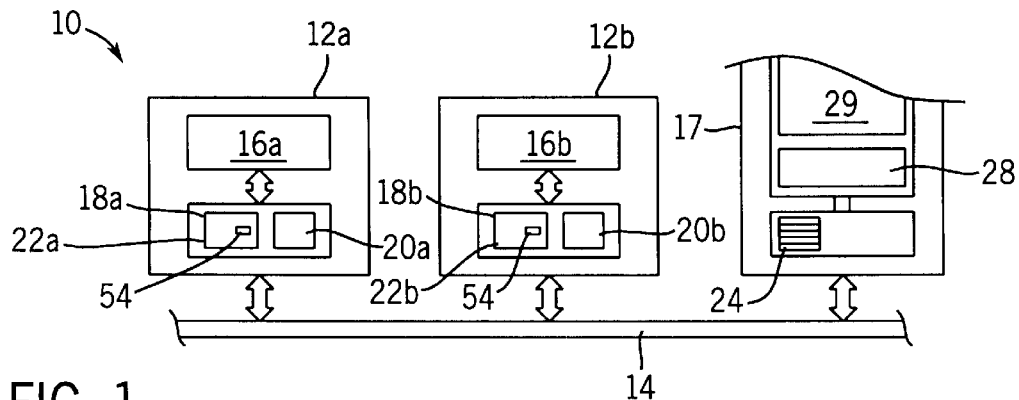
FIG. 1
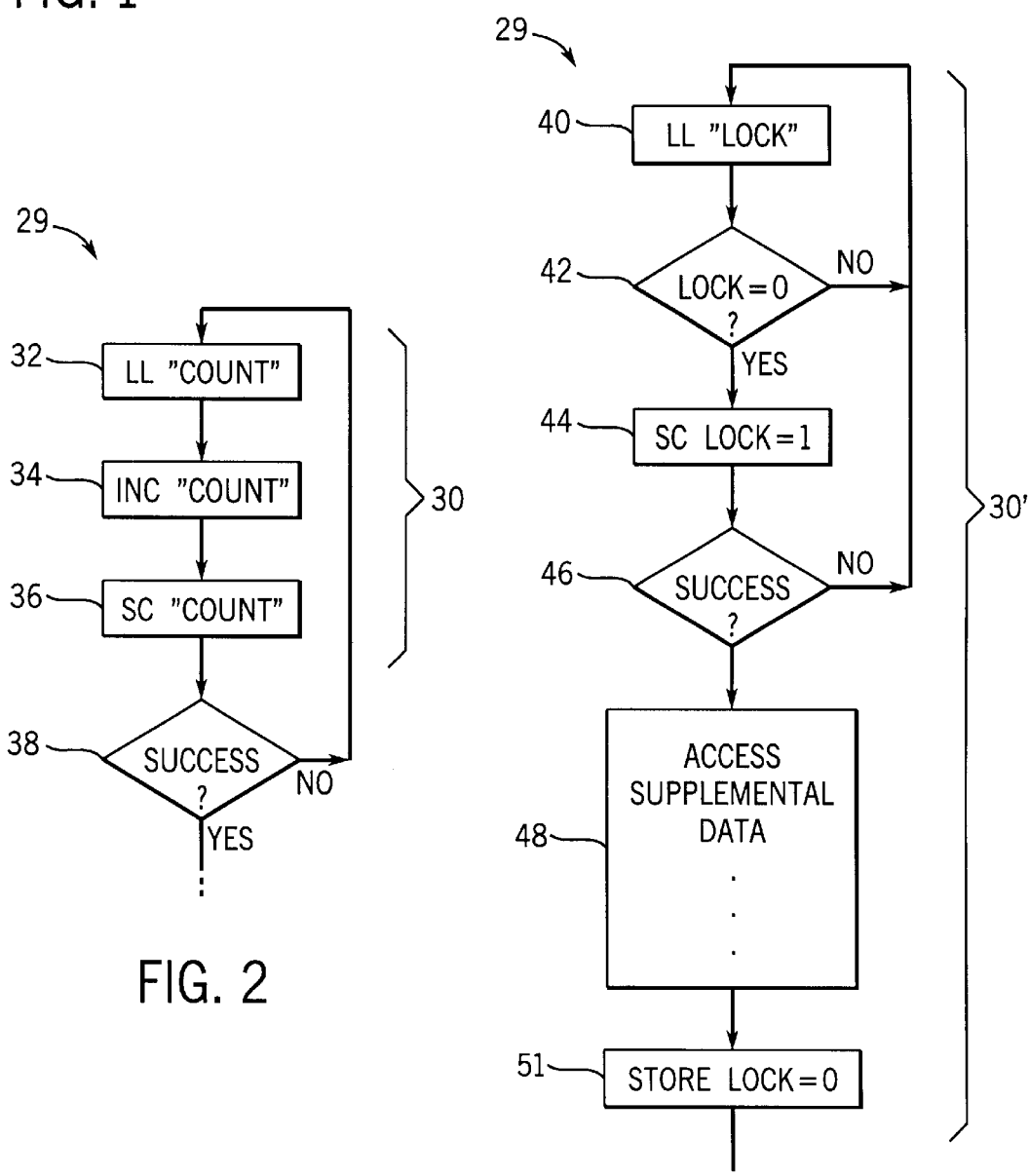
FIG. 2
FIG. 3

METHOD OF USING DELAYS TO SPEED PROCESSING OF INFERRED CRITICAL PROGRAM PORTIONS

STATEMENT REGARDING FEDERALLY SPONSORED RESEARCH OR DEVELOPMENT

This invention was made with United States government support awarded by the following agency: NSF 9810114. The United States has certain rights in this invention.

CROSS-REFERENCE TO RELATED APPLICATIONS

Background of the Invention

The present invention relates to computer architectures for multiprocessor systems and in particular to an architecture providing improved cache control when coordinating the exclusive use of data among multiple processors.

Computer architectures employing multiple processors working with a common memory are of particular interest in web servers. In such an application, each processor may serve a different web site whose content and programs are shared from the common memory.

In situations like this, each of the processors may need to modify the shared data. For example, in the implementation of a transaction-based reservation system, multiple processors handling reservations for different customers must read and write common data indicating the number of seats available. If the processors are not coordinated in their use of the common data, serious error can occur. For example, a first processor may read a variable indicating an available airline seat and then set that variable indicating that the seat has been reserved by the processor's customer. If a second processor reads the same variable prior to setting by the first processor, it may, based on that read, erroneously set the variable again, with the result that the seat is double booked.

To avoid these problems, it is common to use synchronizing instructions for portions of a code (often called critical sections) in which simultaneous access by more than one processor is prohibited.

Synchronizing instructions may be used in two general ways. The first is that the synchronization instruction may provide an atomic function, that is, a function that cannot be interrupted, once begun, by any other processor. Such instructions may perform an atomic read/modify/write sequence as could be used in the above example. A modification of this use is a pair of "bookend" synchronization instructions (such as Load Lock/Store Conditional) that provide a quasi-atomic execution of intervening instructions, in which interruption by other processors cannot be prevented, but can be detected so that the instructions may be repeated until no interruption occurs.

The second way is that the synchronizing instruction may be used to take ownership of a lock variable, which must be owned for modification of other shared data. An atomic synchronization instruction is used to check for the availability of the lock (by checking its value) and if it is available, to take ownership of the lock variable (by changing its value).

In the first use of synchronization instructions, the critical section is short and well defined by the critical section. In the second case, where a lock variable is acquired, the critical section may be arbitrarily long and is not well defined. "Synchronization instruction" as used herein refers broadly to memory access instruction that permits mutual exclusion operations, that is, the exclusion of concurrent access to the same memory addresses by other processors during the access operations.

Like single processor systems, multiprocessors systems may employ cache memory. Cache memory is typically redundant local memory of limited size that may be accessed much faster than the larger main memory. A cache controller associated with the cache attempts to prefetch data that will be used by an executing program and thus to eliminate the delay required for accessing data on the main memory. The use of cache memory generally recognizes the reality that processor speeds are much faster than memory access speeds.

In multiprocessor systems, sophisticated cache coordination protocols, known in the art, are used to ensure that multiple copies of data from the main memory are properly managed to avoid errors caused by different processors working on their different cache copies of main memory. These protocols may work by means of bus communication between different cache controllers, or by using a single common directory indicating the status of multiple caches and their contents. In these cases, the protocols provide for unique ownership of data when a processor writes to its cache copy through an invalidation of other copies. Alternatively, the protocols may broadcast all processor writes without providing for unique ownership.

In addition to the obvious delays resulting from lock contention, synchronization instructions used in multiprocessor systems can create inefficiencies in the movement of data between main memory and the caches of the multiple processors. For example, after execution of the synchronization instructions necessary to acquire a lock variable by a first processor, and the loading of a cache line holding the lock variable into the cache of the first processor, a second processor may attempt to acquire the same lock. The lock variable is then transferred to the cache of the second processor, where it cannot be acquired because the lock is already owned, and then must be transferred back again to the first processor for release of the lock, and then transferred to the second processor again for the lock to be acquired. As is understood in the art, a cache line is the normal smallest unit of data transfer into a cache from another cache or memory.

One of the present inventors has recognized in a jointly authored prior art paper entitled *Efficient Synchronization Primitives For Large-Scale Cache-Coherent Shared-Memory Multiprocessors,* published April 1989 in the "Proceedings of the Third Symposium on Architectural Support for Programming Languages and Operating Systems", pgs. 64–75, that many of these problems could be avoided by having the programmer or compiler explicitly identify critical sections. By providing an explicit demarcation of the critical section through special delimiting instructions, a processor holding a lock as part of the execution of a critical section would be empowered to defer requests by other caches for the cache line holding the lock variable until the lock was released. Each processor waiting for the lock, including the deferred processor, would effectively form a queue for that lock providing a more efficient method of sharing access to the common synchronized data.

Unfortunately such a system requires both a change in architecture and a fundamental rewriting of existing programs and/or compilers in order to indicate the boundaries of the critical sections. While such changes may occur on future generations of programming languages and programs, they do not address the large body of existing programs that might be executed in a multiprocessor system.

BRIEF SUMMARY OF THE INVENTION

The present invention recognizes that with a high degree of reliability, the location and size of a critical section can be inferred without the need for special delineators. Generally, the beginning of the critical section may be inferred by the occurrence of any of a number of pre-existing synchronization instructions. The end of the synchronizing section, while less easy to determine, may be inferred from a second synchronization instruction forming part of a bookend synchronization instruction pair or by the writing to the same memory location accessed by the first synchronization instruction, which is assumed to be a release of a lock variable.

Specifically then, the present invention provides a method of controlling a cache used in a computer having multiple processors and caches communicating through memory. In a first step of the method, as a program is executed by a first processor, a probable initiation of a critical section in the program is inferred from the standard instructions being executed. In response to this inference, the cache of the first processor is loaded with at least one synchronization variable. Prior to completion of the critical section of the executed program, response to other caches requesting write access to the synchronization variable is delayed.

It is therefore one object of the invention to improve data flow between caches during execution of a critical section of a program, in a way that will work with preexisting programs (or programs that have been generated by pre-existing compilers) that have not been modified to explicitly delineate the critical sections. The ability to infer, during program execution, probable initiation and termination of a critical section allows intervening cache requests to be delayed improving global performance of the multiprocessor system.

The beginning of the critical section may be inferred by detecting at least one instruction normally associated with a synchronizing operation, for example, a LOAD-LINKED type instruction.

Thus it is an object of the invention to provide a simple way of hardware detection of the beginning of a critical section.

The delayed cache requests may be specially designated "deferrable" requests and the cache controller may also recognize "undeferrable" requests for write access wherein prior to completion of the critical section, the cache controller responds without delay to other caches requesting undeferrable write access to the synchronization variable.

It is thus another object of the invention to improve cache operation where the critical section is wrongly inferred to have ended and another cache has loaded the data of the "lock variable" that must be re-obtained by the cache of the first processor so that a lock can be released. The undeferrable requests allow the first processor to recover the lock variable so it can release the lock variable without being delayed by the delay mechanism it applied to other processors.

The cache controller may mark a response to an undeferrable request with an instruction to release the synchronization variable back to the first processor at the conclusion of the requesting processor's use of the synchronization variable.

Yet another object of the invention is to permit undeferrable requests to override the delay mechanism of the present invention without disrupting the queue formed by deferrable requests among processors.

The cache controller of the first processor may obtain the synchronization variable for a synchronization operation by making a deferrable request to memory or other caches.

It is therefore another object of the invention for all caches to conform to the convention of deferrable and undeferrable requests both in requesting synchronization variables and in response to requests.

The cache controller may provide read access to the synchronization variable to the caches requesting deferrable access while delaying the response to the caches requesting write access.

Thus it is another object of the invention to allow caches that are placed in queue by the delay, to nevertheless resolve the value of lock variables that may be used in their critical sections, without giving them control of the cache for writing.

The critical section of the executed program may modify protected data and its relationship to the synchronization variable may be inferred. A request by a second processor for the synchronization variable, or possibly even the protected data, may trigger a response from the first processor including not only the synchronization variable, but other data associated with the lock, and provided before it is requested by the second processor.

Thus it is another object of the invention to collocate lock data and protected data to be modified so as to provide more rapid execution of critical sections.

A delayed request for access to the synchronization variable may be buffered and upon completion of the critical section by the first processor, the cache controller may provide the synchronization variable to the processor associated with the first buffered request with the synchronization variable.

Thus one additional object of the invention is to provide a queuing of processors needing to execute the critical section.

Completion of the critical section may be inferred when the first processor issues a first write instruction to the address of the synchronization variable. That write instruction may, but need not be, a STORE-CONDITIONAL-type instruction.

Thus it is another object of the invention to provide a simple method of inferring the conclusion of a critical section.

Alternatively, the completion of the critical section may be determined by the given processor issuing a second write instruction to the address of the synchronization variable. The second instruction may be a standard store-type instruction.

Thus it is another object of the invention to provide an inferential rule which works both for short critical sections, composed of a single, atomic or quasi-atomic operation, and for long critical sections providing a lock-based modification of many data elements.

Whether the critical section is a short or long form may be determined by consulting a prediction table.

Thus it is another object of the invention to provide for speculation as to the type of use of the critical section allowing for flexible implementation of the invention without modification of the program by the programmer for a compiler.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

BRIEF DESCRIPTION OF THE DRAWINGS

FIG. 1 is a block diagram of a multiprocessor system showing processors with their associated caches and cache controllers and/or part of the common memory holding an executable program and data and having a memory controller, such as may be used in the present invention;

FIG. 2 is a flow chart showing a short critical section of the executable program of FIG. 1 in which data is modified quasi-atomically;

FIG. 3 is a figure similar to that of FIG. 2 showing a long form of a critical section in which a lock variable is obtained quasi-atomically and used to control access to other lock data;

DETAILED DESCRIPTION OF THE INVENTION

Figure 4:
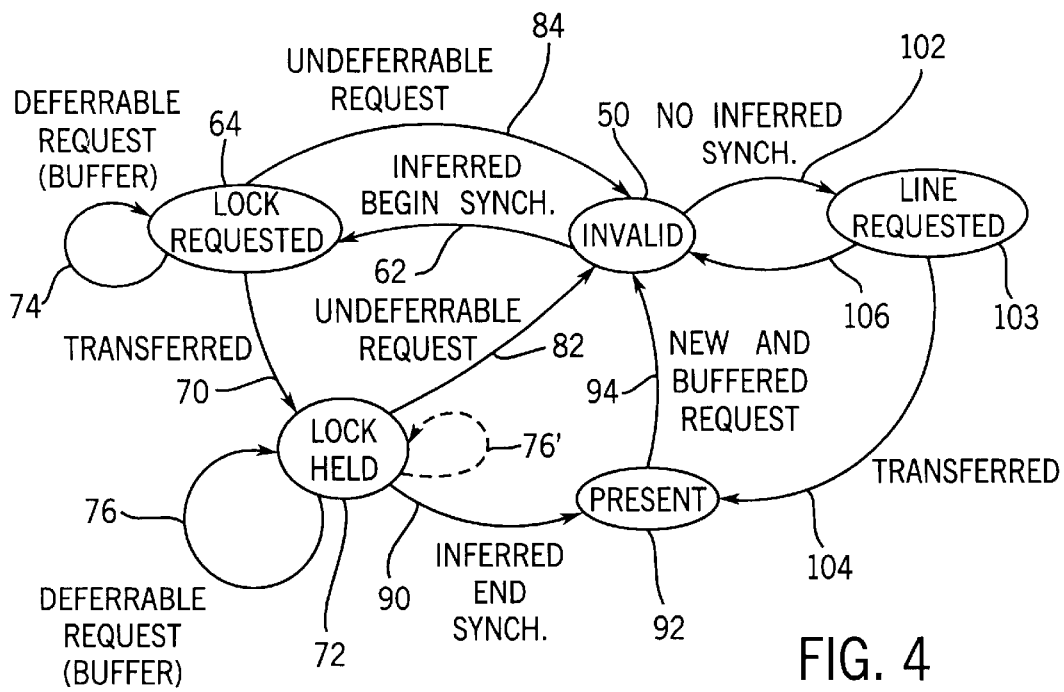
FIG. 4 is a state diagram showing the operation of the cache controller of the present invention detecting the critical sections of FIGS. 2 and 3 including states of inferring the beginning of the synchronization and inferring the end of the synchronization.

Referring now to FIG. 1, a multiprocessor computer architecture 10 includes a number of processor units 12a and 12b connected via a bus structure 14 to a common memory 17.

The processor units 12 include processors 16a and 16b, respectively, communicating with corresponding cache systems 18a and 18b holding a cache (20a and 20b, respectively) and a cache controller (22a and 22b, respectively) the latter controlling the loading of the cache 20 from main memory 17 as part of its prefetching function.

Memory 17 holds a program 29 (including generally instructions and data) that may be executed by the processor units 12. The memory 17 also includes a memory controller 24 which provides operating logic for synchronization instructions of the program 29.

Generally, the multiprocessor computer architecture 10 of FIG. 1 may coordinate the movement of data among its caches 20 using a bus-based protocol wherein the responsibility for cache coordination rests in commands passed between cache controllers 22 or using a directory-based system where cache ownership information is in a directory 28 held within memory showing ownership of cache data. Both techniques are well known in the art, and the present invention is an addition to either of a bus-based or directory system as will be apparent to those of ordinary skill in the art from the following discussion. Thus the present invention is not limited to one particular cache coordination technique nor, as will be explained further below, to a particular architecture or instruction set and is applicable to systems where the memory is distributed among the processor units as may be done in some architectures.

The program 29 may include synchronization instructions which serve to give a single processor unit 12 exclusive access to a piece of critical data without concern that it will be modified by other processors during that access time. Two particular instructions, the LOAD-LINKED instruction and the STORE-CONDITIONAL instruction, which are executed as a sequential pair, will be described in the preferred embodiment. As will be understood from the following discussion, however, the present invention is not limited to these architectures but may work with any instruction set where a critical section can be inferred from instructions or sequences of instructions.

Referring now to FIGS. 2 and 3, critical sections of the program 29 will tend to occur in one of two forms: a short-form critical section 30 shown in FIG. 2 and a long-form critical section 30' shown in FIG. 3.

Referring to FIGS. 1 and 2, the short-form critical section 30 begins with a LOAD-LINKED instruction 32 and ends with a STORE-CONDITIONAL instruction 36. As is understood in the art, the LOAD-LINKED instruction 32 sets a flag which serves to notify the memory controller 24 that the particular address being loaded should be monitored for reading or writing by other processor unit 12 at any time after the LOAD-LINKED instruction 32 but prior to the STORE-CONDITIONAL instruction 36. Any such reading and writing clears the load-linked flag (not shown) that may be accessed by the cache controllers 22. The STORE-CONDITIONAL instruction attempts to writes to the address referenced by the LOAD-LINKED instruction and only if the load-linked flag is still set (indicating the memory location was not affected or read in the intervening time) the STORE-CONDITIONAL is a success, otherwise, the store condition fails. This success or failure can be tested for in a subsequent instruction in the program 29.

Instructions like LOAD-LINKED and STORE-CONDITIONAL (albeit with different names) are found in a variety of commercially available or well-documented computer architectures including the Alpha AXP architecture, the IBM Power PC architecture and the MIPS RISC architecture. Thus, as used herein, instructions that access a memory location and provide for hardware monitoring of subsequent access to that memory locations, for the purpose of effective atomic execution, will be referred to as LOAD-LINKED-type instruction. Instructions that access a memory after a LOAD-LINKED-type instruction, and return a result dependant on whether the memory location was accessed after the LOAD-LINKED-type instruction by another processor will be referred to as STORE-CONDITIONAL-type instructions.

Referring only to FIG. 2, a short-form critical section 30 beginning with a LOAD-LINKED instruction 32 provides for a reading of a synchronization variable named COUNT. In this example, the next instruction 34 increments COUNT, for example, such as might be used to keep track of the number of hits at a web site using a common counter variable. It will be understood that other instructions 34 may also be used. Next, instruction 36 executes a STORE-CONDITIONAL instruction on the same synchronization variable of COUNT. This is the conclusion of the critical section 30.

At succeeding instruction 38, the result of the STORE-CONDITIONAL instruction is tested to see if COUNT was successfully stored by STORE-CONDITIONAL instruction prior to any modification of COUNT by another processor unit 12. If not, the program may loop back to the LOAD-LINKED instruction 32 as indicated. Otherwise it proceeds onward.

The present invention recognizes that the short-form critical section 30 is delimited by LOAD-LINKED and STORE-CONDITIONAL instructions and thus may be readily identified solely by hardware during execution of the program 29 without modification of the program 29. This allows the present invention to work with legacy and current implementations of programs and compilers.

Referring now to FIG. 3, a simple example of the long-form critical section 30' begins with a LOAD-LINKED instruction 42 loading synchronization variable LOCK. Here LOCK provides a locking mechanism enforced by the program 29 which requires any processor executing the program 29 to read the LOCK variable and not to modify other locked data if another processor has set the LOCK variable. In a variation of this long form, a standard LOAD instruction of the LOCK variable may precede the LOAD-LINKED instruction to avoid undesirable side effects of spinning on a LOAD LINKED instruction. Both of these forms, and others, allow the beginning of the critical section to be inferred from executed instructions, in this case, the LOAD-LINKED instruction.

At LOAD-LINKED instruction 42, the LOCK variable is checked to see if it is free indicated for example by LOCK being equal to zero. If not, the program 29 may spin at LOAD-LINKED instruction 42 looping back to instruction 40. If the lock is available (LOCK being equal to one), then the program 29 proceeds to STORE-CONDITIONAL instruction 44, executing on LOCK setting it equal to one to indicate that the lock is now being held by the processor unit 12 executing this instance of the program 29.

At instruction 46, the result of the STORE-CONDITIONAL is tested. If the STORE-CONDITIONAL was a failure, indicating that another processor unit 12 may have read and written to LOCK in between instructions 40 and 44, the program 29 loops back to instruction 40 to begin again. Otherwise, the program 29 assumes that lock is held by it and it proceeds to instruction 48 to execute a number of instructions on locked data. An example of protected data might be airline reservation information, which must be read, modified and cross-referenced prior to any interruption by another processor unit 12.

Finally, the lock is released by conventional store instruction 51 unsetting the LOCK synchronization variable. Here an inference that the long-form critical section 30' ends at STORE-CONDITIONAL instruction 44 would be an error. The present invention accounts for both of these modes as will be described.

Referring now to FIG. 4, each cache controller 22 operating independently or under the guidance of a directory 24 executes firmware implementing a state diagram beginning at an INVALID state 50. INVALID state 50 indicates according to normal convention that the cache 20 associated with the processor unit 12 does not contain valid data that may be read or written to.

Figure 6:
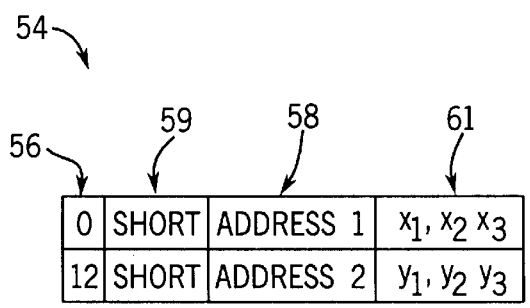
FIG. 6 is a representation of a data table held by the cache controller for execution of the present invention and in particular for inferring short and long versions of FIGS. 2 and 3.
Figure 5:
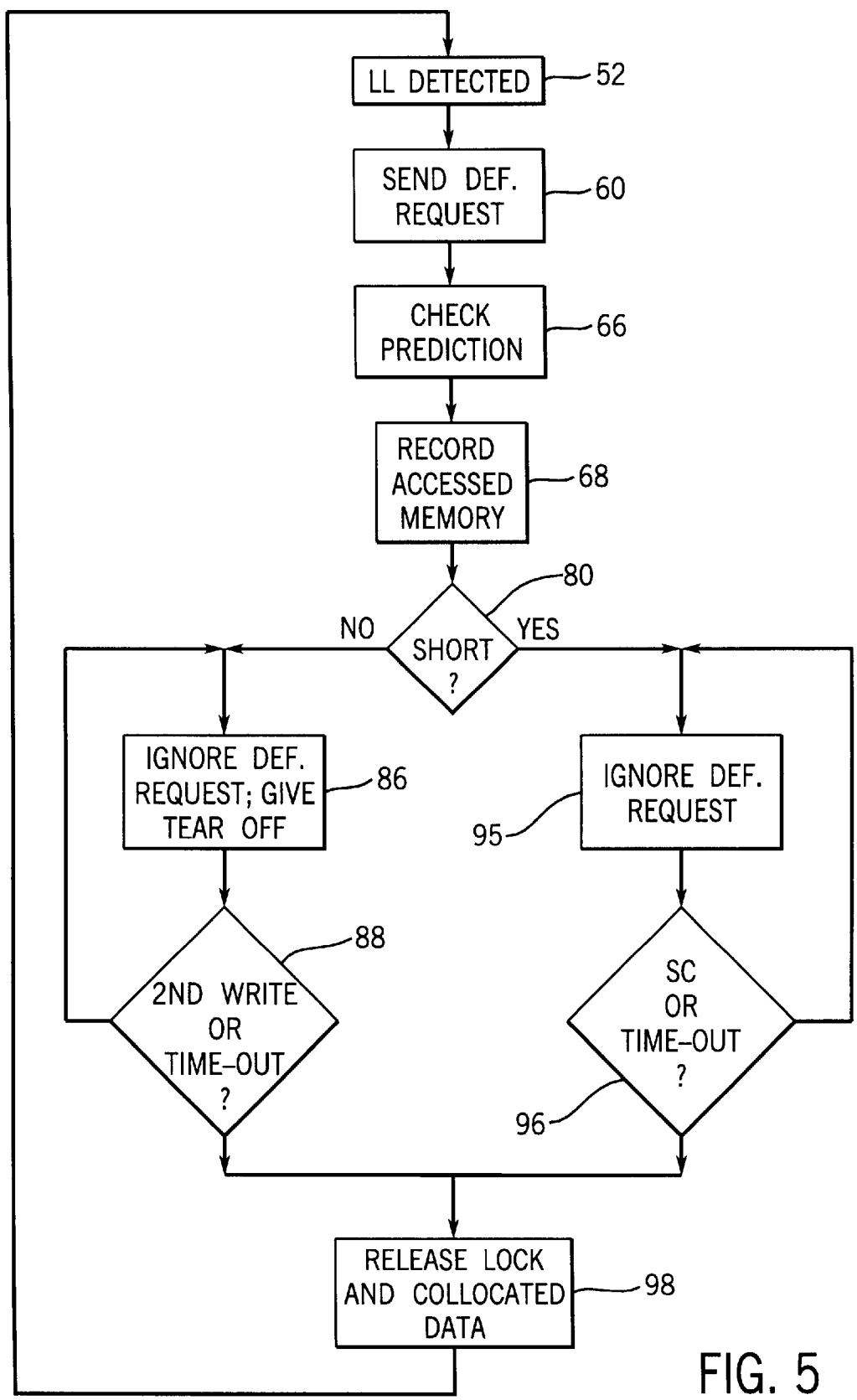
FIG. 5 is a flow chart of the steps executed by the cache controllers of FIG. 1 in the states of FIG. 4 of inferring the beginning of a critical section and the end of the critical section.

Referring now also to FIGS. 5 and 6, in the INVALID state 50, each cache controller 22 monitors the instructions executed by its processor 16 to detect a LOAD-LINKED instruction as indicated by process block 52. The value of the program counter 56 (not shown) of the processor 16 at the detected LOAD-LINKED instruction is enrolled in a lock predictor table 54 (shown in FIG. 6) held by each cache controller 22 or in a directory 24 accessible to the cache controllers 22. The program counter value 56 uniquely identifies the LOAD-LINKED instruction and is associated with a load address 58 in memory 17 which that LOAD-LINKED instruction accesses.

At succeeding process block 60, a deferrable request for exclusive use of a cache line (being a block of data from memory 17) holding the synchronization variable indicated in the LOAD-LINKED instruction is sent to all other caches 20 and to memory 17.

Referring to FIG. 4, at this point, there is an inferred beginning of a critical section 30 (or 30') indicated by state transition 62 from the INVALID state 50 to the LOCK-REQUESTED state 64.

As indicated in FIG. 5, the cache controller 22 now checks the lock predictor table 54 as indicated by process block 66. Initially the lock predictor table 54 will provide a prediction value 59 predicting the use of a short form of the critical section shown in FIG. 2. During both of the LOCK REQUESTED state 64, as indicated by instruction 68 of FIG. 5, the cache controller 22 begins recording the cache lines 61 (memory addresses) access during the critical section. These lines 61 may be stored in the lock predictor table 54. This optional feature may be used as will be described below to forward to later requesting caches not only the lock variable but also the protected data and thus will only be used for long form prediction.

During the LOCK-REQUESTED state 64 as indicated by state transition 74, deferrable read ownership exclusive requests from other caches 20 will be ignored. However, the first such deferrable request will be buffered by the cache controller 22 so that it may respond at the conclusion of its critical section 30 or 30' by supplying the cache line directly to one first requesting cache. In this way, a queuing structure is naturally formed of caches making the deferrable request. On the other hand, during the LOCK-REQUESTED state 64 as indicated by state transition 84 undeferrable read ownership exclusive requests from other caches 20 will be serviced promptly per standard cache behavior.

Referring again to FIG. 4, the cache controller remains in the LOCK REQUESTED state 64 until the requested data is obtained by the cache 20 either from another cache 20 or from memory 17 as indicated by state transition 70 whereupon the cache controller 22 moves to the LOCK HELD state 72.

In the LOCK HELD state 72, as with the LOCK-REQUESTED state 64, as indicated by state transition 76, deferrable read ownership exclusive requests from other caches 20 will be ignored. However, the first such deferrable request will be buffered by the cache controller 22 so that it may respond at the conclusion of its critical section 30 or 30' by supplying the cache line directly to one first requesting cache.

During the LOCK-HELD state 72, a standard or undeferrable request for exclusive ownership request from another cache 20 may be received. The way in which the cache controller treats the undeferrable request depends on whether it has predicted a short-form or a long-form critical section 30 or 30' as controlled by branch instruction 80.

In the case of a predicted short-form critical section 30, as indicated by the right hand branch of instruction 80 of FIG. 5, then undeferrable requests for exclusive ownership of the cache are dealt with within a few cycles on an immediate basis as indicated by process block 95 in FIG. 5 and state transition 82 from LOCK-HELD state 72 in FIG. 4. As mentioned above, this undeferrable request allows the cache controller 22 to release the cache line to another cache that in fact has the lock (even though the current cache controller 22 has the data) so that the other cache controller 22 may release the lock. When the cache contents are released in response to an undeferrable request, the response may be marked so that the receiving cache 20 returns ownership of the cache back to the initial cache 20 when it is done. The other caches 20 then do not flush their buffered deferrable requests upon the undeferrable request so that a queue of deferrable requests survives the interruption of the undeferrable request. Deferrable requests are ignored at process block 95 corresponding to the above described state transition 76 of FIG. 4. By preserving the queue of deferrable requests, which was established by the timing of the various processors arriving at their critical sections, the risk of a single processor dominating the lock (for example, the fastest requester) is reduced.

Decision block 96 looks for a STORE CONDITIONAL instruction (e.g., instruction 36 of FIG. 2) to infer the end of the critical section. Upon occurrence of the STORE-CONDITIONAL instruction tested for by decision block 96, the end of the critical section is inferred at state transition 90 (of FIG. 4) and the cache controller 22 executes process block 98 (described below) and moves into the PRESENT state 92, indicating that it has the lock and lock data but not ownership of the lock. A time out like that described with respect to process block 88 also applies to infer an end of the critical section.

Referring now to instruction 86 following instruction 80 of FIG. 5 on the left hand branch, if a long-form critical section 30' is predicted, then deferrable requests are delayed at state transitions 76', however, a "tear-off" copy of the requested data may be forwarded to the requesting cache. A tear-off copy provides read ownership of the data but not write ownership and thus allows, for example, another cache 20 in the LOCK-REQUESTED state 64 to evaluate whether it can receive the lock and thus to move onto other tasks or to spin at the request as the programmer desires. The tear-off copy also allows speculative execution beyond the synchronization instruction by the requesting cache 20 such as normally is prevented by most architectures using a synchronization instruction.

At process block 88, any write instruction (e.g., instruction 51 of FIG. 3) after a first STORE-CONDITIONAL instruction (e.g., instruction 44 of FIG. 3) referencing the same address as the LOAD LINKED instruction (e.g., instruction 40 of FIG. 3) is used to infer the end of the critical section 30' and to cause the transition to the PRESENT state 92 of FIG. 4. As a practical matter, process block 88 also includes a timer timing the elapsed time since entry into LOCK HELD state 72 and if that time exceeds a predetermined value, the end of the critical section 30 is also inferred. The cache controller then moves to process block 98.

At process block 98, the lock data and lock variable serving as a synchronization variable are released. The present invention allows the lock variable to be in the same cache line as the protected data that is manipulated when the processor has the lock. This is termed collocation and is normally undesirable as requests by other processors for the protected data takes the data from the processor which has control of the lock, and to no effect since the lock is required to use the protected data. The delay of deferrable requests of the present invention, however, makes collocation extremely efficient. The present invention goes further than this by providing "virtual collocation" in the collection of a list of data accessed during the critical section per process block 68 described above. The cache lines of this data are forwarded to the next processor in the deferrable request based queue, thus anticipating the data that the processor will need. Note that unlike collocation, virtual collocation does not require that the protected data be in the same cache line as the lock variable.

As used herein, "synchronization variable" shall refer to data used in a mutual exclusion operation including the lock variable and the protected data described above.

From the PRESENT state 92, the cache controller may proceed to the INVALID state 50 as indicated by state transition 94. This may be triggered by the receipt of a deferrable request, an undeferrable request, or the processing of previously buffered low or undeferrable requests at state transitions 74 or 76.

At the time of transition to the INVALID state 50, the cache controller 22 may review the lock predictor table 54 associated with the particular lock and forward to the next cache and queue whose request has been buffered, the associated cache lines 61 used during the critical section. In this way, subsequent caches access to the necessary data for the synchronization will be much improved.

The row of the lock predictor table 54 for each critical section 30 or 30' identified by the program counter value for the LOCK LINKED instruction may be retained and used each time that synchronization instruction is encountered. Determination of whether the prediction value 59 in the lock predictor table 54 is corrected may be determined after the fact by evaluating the efficiency of data flow through the cache and used to update the lock predictor table 54.

Referring now again to FIG. 4, the INVALID state 50 of the cache controller 22 may also move via state transition 102 to a LINE REQUESTED state 103 where the cache 20 may contain the same data as requested at LOCK-REQUESTED state 64 but where it is not inferred to be a critical section 30 or 30' by detection of a LOADLOCKED instruction. If the data line requested is obtained, the cache controller 22 proceeds to PRESENT state 92 along state transition 104. Alternatively, the cache controller may move to the INVALID state 50 along state transition 106 if a deferrable or undeferrable request for exclusive ownership is received.

While the inference of a short-form or long-form critical section 30 or 30' is relatively simple, when LOAD-LOCKED type instructions are provided, it will be recognized that more sophisticated instruction sequence patterns can be used so as to allow this inference with a variety of different architectures. Further the invention is not limited to the synchronization instruction of LOAD LOCKED/STORE-CONDITIONAL but may be used for true atomic instructions such as FETCH&φ-type instructions.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A method of cache control for a computer having multiple processors and associated caches communicating through memory, comprising the steps of:
   (a) during execution of a program by a given processor, infer from execution of the program, a probable entry into a critical section having at least one synchronization variable;
   (b) prior to completion of the execution of the inferred critical section, introducing added delay in responding to other caches requesting access to at least one of the synchronization variables, wherein delayed requests are deferrable requests and
   (c) detect when the inferred critical section has been wrongly inferred and terminate the delay in responding to an other request.

2. The method of claim 1 wherein the detection of a probable execution of a critical section includes detecting a beginning of the critical section as marked by a synchronization instruction.

3. The method of claim 1 wherein the instruction is a LOAD LOCK type instruction.

4. The method of claim 1 including during step (b), performing operations requiring mutual exclusion.

5. The method of claim 1 wherein the cache control method also recognizes an undeferrable access request and wherein in step (c) terminates the delay in responding to the other request that is an undeferrable request.

6. The method of claim 5 wherein the cache controller marks the response to undeferrable requests with an instruction to release the synchronization variable back to the given processor at the conclusion of the other cache's use of the synchronization variable.

7. The method of claim 5 wherein during step (b) the cache controller obtains a synchronization variable for loading by making a deferrable request of the memory and other caches.

8. The method of claim 5 wherein at step (b) the cache controller provides to the other cache's requesting write access to the synchronization variable, instead a read only record of what the synchronization variable was at a previous time.

9. The method of claim 1 wherein the critical section of the executed program accesses a lock variable and protected data and wherein at step (b) the cache controller loads into the cache of the given processor the lock variable and the protected data.

10. The method of claim 9 wherein the protected data is not in the same cache line as the lock variable.

11. The method of claim 1 wherein at step (b) a delayed request for write access is buffered and including step (c) upon completion of the critical section, responding to the buffered request with the synchronization variable.

12. The method of claim 1 whereupon at step (b) completion of the critical section is determined by the given processor issuing an instruction after step (a) modifying the synchronization variable.

13. The method of claim 12 where the instruction modifying the synchronization variable is a synchronization instruction.

14. The method of claim 13 wherein instruction modifying the synchronization variable is a STORE CONDITIONAL type instruction.

15. The method of claim 1 whereupon at step (b) completion of the critical section is determined by the given processor issuing a second instruction modifying the synchronization variable.

16. The method of claim 15 wherein the second write instruction is a standard STORE type instruction.

17. The method of claim 1 whereupon at step (b) completion of the critical section is determined by a predetermined time-out value measured from the time of entry into the critical section.

18. The method of claim 1 whereupon at step (b) completion of the critical section is determined by consulting a prediction table predicting a likelihood that the critical section terminates at a first or second writing of the synchronization variable after step (a) and wherein the prediction table is initially set to predict that the critical section ends after the first writing of the synchronization variable.

19. A method of cache control for a computer having multiple processors and associated caches communicating through memory, comprising the steps of:
(a) during execution of a program executed by a given processor, detect execution of a critical section of the program;
(b) load into the cache of the given processor, a first synchronization variable to perform operations requiring mutual exclusion;
(c) record access of the processor of other synchronization variables during execution of the critical section of the program; and
(d) upon completion of the execution of the critical section of the program, release to another cache requesting access to the first synchronization variable the first synchronization variable and the other synchronization variables.

20. The method of claim 17 wherein the other synchronization variables are not in the same cache line as the first synchronization variable.

* * * * *